United States Patent [19]

Bearss et al.

[11] Patent Number: 4,791,165

[45] Date of Patent: Dec. 13, 1988

[54] INK-JET INK FOR PLAIN PAPER PRINTING

[75] Inventors: James G. Bearss, Kootenai, Id.; Kenneth A. Norton, Corvallis, Oreg.

[73] Assignee: Hewlett-Packard Company, Palo Alto, Calif.

[21] Appl. No.: 28,021

[22] Filed: Mar. 16, 1987

Related U.S. Application Data

[63] Continuation of Ser. No. 756,864, Jul. 18, 1985, abandoned.

[51] Int. Cl.$^4$ .............................................. C08L 39/00
[52] U.S. Cl. .................................... 524/516; 106/22; 523/160
[58] Field of Search ................. 106/22; 260/DIG. 38; 523/160; 524/850, 853, 386, 388, 514, 516; 252/203, 227, 230; 525/203

[56] References Cited

U.S. PATENT DOCUMENTS

| | | | |
|---|---|---|---|
| 3,687,887 | 8/1972 | Zabiak | 346/140 |
| 3,903,034 | 9/1975 | Zabiak et al. | 524/247 |
| 4,532,276 | 7/1985 | Knable et al. | 524/25 |

OTHER PUBLICATIONS

Derwent Abstract Accession No. 81-08803D/06, Japanese Patent No. J55155068, May 5, 1979.
Derwent Abstract Accession No. 83-10392K/05, Japanese Patent No. J57187289, Nov. 17, 1982.
Derwent Abstract Accession No. 85-221411/36, Japanese Patent No. J60144376, Jul. 30, 1985.

Primary Examiner—Amelia Burgess Yarbrough
Attorney, Agent, or Firm—William J. Bethrum

[57] ABSTRACT

An ink composition is provided for an ink-jet printer, preferably a thermal ink-jet printer. The composition comprises about 5 to 40 wt % glycol, about 60 to 90 wt % water, about 0.001 to 10 wt % polymer blend and about 1 to 7 wt % dye. The polymer blend includes both uncharged and charged monomeric units.

The glycol and polymer blend act to form a soft plug that forms in the orifice of the ink-jet pen. The soft plug prevents further evaporaion of water, but unlike a hard plug, is readily blown out upon firing. The charged units in the polymer blend contribute to water fastness and light fastness of the dye on paper. Further, by employing appropriate functional groups in the polymer blend, chemical degradation of the ink dye can be retarded on acid or alkaline papers.

8 Claims, No Drawings

INK-JET INK FOR PLAIN PAPER PRINTING

This is a continuation of co-pending application Ser. No. 756,864, filed on July 18, 1985, now abandoned.

BACKGROUND OF THE INVENTION:

This invention relates to inks employed in ink-jet printing, and, more particularly, to an ink composition especially suitable for thermal ink-jet printers.

In thermal ink-jet printing, resistive heating is used to vaporize the ink, which is expelled through an orifice in the ink-jet pen toward the paper substrate. Such printers are provided with a plurality of orifices, each orifice being associated with a resistor. At the appropriate time, current is passed through the particular resistor associated with an orifice from which it is desired to expel ink (the resistor being selected by a microprocessor in the printer). This process is known as firing. The pattern of particular orifices selected at any instant determine the configuration of the letter, number, symbol, etc. that is printed on the paper.

A problem with ink-jet printers is the evaporation of the carrier fluid; for aqueous-based systems, the carrier fluid is, of course, water. Upon evaporation of the carrier fluid, components in the ink precipitate out and form a hard plug in the orifice. The presence of the hard plug can prevent proper firing of the ink, so that the ink is either partially or totally blocked from reaching the paper.

On the other hand, it is desirable to prevent the evaporation of the various constituents of the ink, without adversely affecting the firing of the ink. Efforts to develop suitable ink compositions are continually in progress.

SUMMARY OF THE INVENTION

Accordingly, it is an object of this invention to provide an ink composition for an ink-jet printer that prevents evaporation of the carrier fluid while promoting proper firing.

It is another object of this invention to provide an ink composition for an ink-jet printer that forms a soft plug in the orifice.

It is yet another object of this invention to provide an ink composition for a thermal ink-jet printer having improved bubble formation and collapse on resistor surfaces.

It is still another object of this invention to provide an ink composition for an ink-jet printer having water and dye fastness on the paper substrate.

These and further objects of the invention will become apparent from the hereinafter following commentary.

In accordance with the invention, an ink composition suitable for use with ink-jet printers, particularly thermal ink-jet printers, is provided. The ink composition comprises:
glycol 5–40 wt %
water 60–90 wt %
polymer blend 0.001–10 wt %
dye 1–7 wt %.
The polymer blend includes at least one polymer or copolymer containing charged monomeric units.

The ink composition of the invention forms a soft plug in the orifice which prevents further evaporation of water once formed. However, the soft plug is easily removed, or blown out, by firing. The use of polymers improves bubble formation and stability on resistor surfaces used in thermal ink-jet pens.

The mechanism that leads to the formation of the soft plug also contributes to water fastness on paper. Upon evaporation of water, the polymeric material forms a film in which the dye molecules of the ink are trapped. This film improves water fastness and light fastness of the dye on the paper substrates. Further, by use of appropriate functional groups in the polymer blend, chemical degradation of the dye can be slowed on acid or alkaline papers.

DETAILED DESCRIPTION OF THE INVENTION

The composition of the ink in accordance with the invention comprises:
glycol 5–40 wt %
water 60–90 wt %
polymer blend 0.001–10 wt %
dye 1–7 wt %
The ink composition of the invention is suitably employed in any ink-jet printer. However, it is particularly useful in thermal ink-jet printers.

The glycol may be any member of the glycol family, including propylene glycols, polypropylene glycols, ethylene glycols, and polyethylene glycols and all of the glycol families of ethers and mixtures thereof. It is the hygroscopic property of the glycol which aids in formation of the soft plug of ink in the orifice. As noted above, the soft plug is easily blown out upon firing of the resistor associated with the orifice.

Examples of suitable glycols include ethylene glycol, propylene glycol, diethylene glycol, dipropylene glycol, triethylene glycol, tetraethylene glycol, 1-methoxy-2-propanol, dithioglycol, and ether derivatives.

The concentration of glycol ranges from about 5 to 40 wt % of the composition. More than about 40% results in both an increase in feathering (migration of the dye along the fibers of the paper, resulting in smearing of the ink) and drying time of the ink, while less than about 5% contributes to clogging of the nozzles in the ink-jet pen.

The concentration of the dye desirably ranges from about 1 to 7 wt %. Less than about 1 wt % results in an ink of unacceptable lightness, while greater than about 7 wt % results in clogging of the nozzles in the ink jet pen. Examples of suitable dyes include Food Black 2, Carta Black, Direct Black (DB) 19, DB 51, DB 109, DB 154, Direct Blue (DB1) 86, DB1 199, Direct Red (DR) 9, DR 32, Acid Red (AR) 249, AR 17, AR 52, Acid Yellow 23, Acid Blue (AB1) 185, AB1 9, although there are many other suitable dyes as well. It is contemplated that any of the dyes used in inks for ink-jet printers may be employed in the practice of the invention.

The concentration of the polymer blend ranges from about 0.001 to 10 wt %. If the concentration is lower than about 0.001%, there is poor bubble formation and the print quality if poor. If the concentration is greater than about 10%, then there is a tendency for rapid plugging of the orifice.

The polymer blend is a blend of polymers and copolymers, which contain both charged and uncharged monomeric units. The presence of the charged units serves to electrostatically attract the dye to the polymer when in a drop of ink. The charged units also provide stronger adherence of the polymer to a paper substrate than without the charged units. As a consequence of the electrostatic binding of the dye to the polymer and the improved adherence of the polymer to the paper, water fastness (the amount of water needed to remove the ink from the paper) is improved. As a further consequence, migration of the dye along the paper fibers is reduced or prevented, thus minimizing the problem of feathering.

The presence of the charged units also aids in bubble formation and stability during firing. The polymer blend forms a smooth polymeric coating on the firing resistor. Upon firing, the charged groups of the polymer molecule are directed toward the inside of the bubble, while the backbone of the molecule is directed toward the outside, or toward the resistor surface. Thus, substantially uniform nucleation of the ink bubble is obtained.

The polymers suitable in the practice of the invention contain as functional groups, for example, acetals, ketals, aliphatic aldehydes, aromatic aldehydes, alicyclic aldehydes, heterocyclic aldehydes, amines, amine salts, amino acids, peptides, anilines, heterocyclic amines, azo, azoxy, and diazonium derivatives, carboxylic acids and their derivatives, including esters, lactones, purines, pyrimidines, amides, cyanates, isocyanates, isothiocyanates, thiocynates, deuterated compounds, ethers, hydrazines, hydrazones, osazones, hydrocarbons, hydroxy-containing compounds, imines, ketones, nitriles, organo-metallic derivatives, sulfur-containing compounds, tyrosines, ureas, thioureas and quaternary amines. Of the foregoing functional groups, the amine salts, amino acids, peptides, diazonium derivatives, organo-metallic derivatives and quaternary amines contain charged units. As used herein, the term "polymer blend" in the ink composition is intended to include any mixture of polymers and copolymers suitable in the practice of the invention.

Examples of specific copolymers include (a) polyvinyl pyrrolidone/polyvinyl acetate copolymers, typically in 60/40, 70/30. 80/20 ratios of polyvinylpyrrolidone (PVP) to polyvinyl acetate (PVA) and (b) polyvinylpyrrolidone/dimethylaminoethylmethacrylate copolymer in ratios ranging from about 60/40 to 90/10 PVP/dimethylaminoethylmethacrylate. The latter copolymer is an example of a copolymer containing charged monomeric units; the dimethylaminoethylmethacrylate polymer contains charged functional groups. A blend of these two polymers is suitably employed in the practice of the invention.

In the polymer blend, the ratio of polymer containing uncharged units to polymer containing charged units ranges from about 0.1:1 to 2:1 and preferably is about 0.8:1, by wt %. The polymer blend contains both types of polymers or copolymers. The presence of both types of polymers results in the formation of improved ink films on paper.

The presence of the polymer in the ink composition appears to reduce chemical degradation of the ink dye by the paper in the presence of light. European papers may contain imines which are basic and may attack the dye molecule. The presence of ester groups in the polymers used can be considered to compete with the dye molecule for attack by the imines. Americal paper contains sulfite or hypochlorite, and again the use of appropriate functional groups can slow the attack on the dye molecule.

An important aspect of the invention is the use of polymers containing charged units, which interact electrostatically with both the dye and the paper substrate. All charged units are intended to be included. The use of a negatively charged polymer with positively charged counter-ions would be employed in the case of a positively charged dye molecule, whereas, in the present case, the dye molecule (as listed above) is negatively charged, indicating the use of a positively charged polymer which would have attendant anionic counter-ions. The means by which the charged polymer backbone contributes to water fastness on paper involves the chromatography of the small counter-ions into the paper through the capillaries between fibers. This results in the dye molecule and large charged polymer residing on the surface of the paper and electrostatically binding to the paper surface.

A preferred composition comprises 15% glycol, preferably diethylene glycol, 81% water, 1% GAFquat 734 (a polyvinylpyrrolidone/dimethylaminoethylmethacrylate copolymer available from GAF Corp., New York, N.Y.), and 3% Food Black 2, all by weight.

The purity of all components is that found in common commercial practice. Further, it should be noted that small amounts of other components may be added for particular purposes, as is well-known for ink-jet ink compositions. For example, bactericides and fungicides may be added.

EXAMPLES

EXAMPLE 1

An ink was formulated comprising the composition 15 wt % diethylene glycol, 81.905 wt % deionized water, 0.055 wt % GAFquat 734, 0.04 wt % 60/40 polyvinylpyrrolidone/vinyl acetate copolymer and 3 wt % Food Black 2 dye. The ink was prepared by mixing the components together, and the final pH was 6.25, adjusted by adding triethanol amine.

The ink was loaded in a Think-jet pen and when printed on paper gave improved water fastness and fade resistance over previous formulations. Free bubble experiments, which determine bubble stability and lifetime, resulted in larger, more reproducible vapor explosions of the ink on the print-head substrate. The ink soft-plugged after 80 seconds, but the plug was cleared by firing less than 48 times. The ink gave excellent print and contrast on a variety of plain papers when loaded in a prototype plain paper printhead.

EXAMPLE 2

An ink was formulated comprising the composition 20 wt % diethylene glycol, 75 wt % deionized water, 0.5 wt % GAFquat 734, 0.5 wt % 70/30 PVP/PVA and 4 wt % Food Black 2. The ink was prepared by mixing the components together, and the final pH was 6.5, adjusted by adding triethanolamine. The ink was loaded into a prototype plain paper ink-jet printhead and gave improved bubble stability and print quality on a variety of plain papers.

EXAMPLE 3

An ink was formulated comprising 40 wt % diethylene glycol, 54.05 wt % deionized water, 0.1 wt % GAFquat 734, 0.05 wt % 60/40 PVP/PVA and 5.8 wt % Food Black 2. The pH of the ink was adjusted to 6.5 with triethanolamine. The ink was loaded into a Think-jet pen and gave acceptable print quality on a variety of office papers.

EXAMPLE 4

An ink was formulated comprising 30 wt % diethylene glycol, 62.4 wt % deionized water, 1 wt % GAFquat 734, 5.8 wt % Food Black 2 and 0.8 wt % Acid Blue 249. The ink was pH-adjusted to 6.5 with triethanolamine. The ink gave acceptable print on a large variety of office papers, when delivered from an ink-jet pen.

EXAMPLE 5

An ink was formulated comprising 11 wt % dithioglycol, 84.83 wt % deionized water, 0.25 wt % GAF-quat 734, 0.25 wt % 60/40 PVP/PVA and 3.67 wt % Mobay Special Black (equivalent to Food Black 2). The ink was loaded into a prototype ink-jet pen and gave acceptable print on a wide variety of papers.

Thus, there has been disclosed an ink composition suitable for used in ink-jet printers. Various modifications and changes will make themselves available to those of ordinary skill in the art, and all such changes and variances not deviating from the spirit and essence of the invention are intended to be covered by the appended claims.

We claim:
1. An ink-jet composition comprising:
glycol 5-40 wt. %
water 60-90 wt. %
polymer blend 0.001-10 wt. %
dye 1-7 wt. %
wherein said polymer blend comprises polyvinyl pyrrolidone/polyvinyl acetate copolymer, ranging in ratio from about 60/40 to 90/10 PVP/PVA or polyvinyl pyrrolidone/polyvinyldimethylaminoethylmethacrylate copolymer, ranging in ratio from about 60/40 to 90/10 PVP/polyvinyldimethylaminoethylmethacrylate.

2. The composition of claim 1 wherein said glycol is hygroscopic.

3. The composition of claim 2 wherein said glycol is selected from the group consisting of ethylene glycol, diethylene glycol, propylene glycol, polyethylene glycol, triethylene glycol, tetraethylene glycol, 1-methoxy-2-propanol, polypropylene glycol, dithioglycol, thiodiglycol, the ether derivatives thereof and mixtures thereof.

4. The composition of claim 3 wherein said glycol consists essentially of diethylene glycol.

5. The composition of claim 1 wherein said dye consists essentially of at least one component selected from the group consisting of Food Black 2, Carta Black, Direct Black 19, Direct Black 51, Direct Black 109, Direct Black 154, Direct Blue 86, Direct Blue 199, Direct Red 9, Direct Red 32, Acid Yellow 23, Acid Blue 185, Acid Blue 9 and Acid Red 249.

6. The composition of claim 1 wherein said polymer blend contains uncharged monomeric units and charged monomeric units ranging in ratio from 0.1:1 to 2:1.

7. The composition of claim 6 wherein said ratio is about 0.8:1.

8. The composition of claim 1 wherein said composition comprises about 15% diethylene glycol, 81% water, 1% polyvinylpyrrolidone/dimethylaminoethylmethacrylate and 3% Food Black 2.

* * * * *